(12) United States Patent
Zeidler et al.

(10) Patent No.: US 10,232,523 B2
(45) Date of Patent: Mar. 19, 2019

(54) SEVERING APPARATUS FOR SEVERING A STRING OF PASTY FOODSTUFF MATERIAL

(71) Applicant: VEMAG Maschinenbau GmbH, Verden/Aller (DE)

(72) Inventors: Ruben Zeidler, Verden (DE); Uwe Pankoke, Rethem (DE); Uwe Flammann, Kirchlinteln (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 261 days.

(21) Appl. No.: 15/070,813

(22) Filed: Mar. 15, 2016

(65) Prior Publication Data

US 2016/0271819 A1 Sep. 22, 2016

(30) Foreign Application Priority Data

Mar. 19, 2015 (DE) .................. 10 2015 104 155

(51) Int. Cl.
| | | |
|---|---|---|
| *B26D 1/36* | (2006.01) | |
| *B26D 1/00* | (2006.01) | |
| *B26D 1/28* | (2006.01) | |
| *B26D 7/06* | (2006.01) | |
| *A22C 17/00* | (2006.01) | |
| *A23P 30/00* | (2016.01) | |

(52) U.S. Cl.
CPC ............. *B26D 1/36* (2013.01); *A22C 17/002* (2013.01); *A23P 30/00* (2016.08); *B26D 1/0006* (2013.01); *B26D 1/28* (2013.01); *B26D 7/0625* (2013.01); *B26D 7/0683* (2013.01); *B26D 2001/006* (2013.01); *B26D 2001/0046* (2013.01); *B26D 2210/02* (2013.01)

(58) Field of Classification Search
CPC ......................................................... B26D 1/36
See application file for complete search history.

(56) References Cited

U.S. PATENT DOCUMENTS

| 4,343,603 A * | 8/1982 | Pavlow ................... A23P 20/00 |
|---|---|---|
| | | 118/15 |
| 4,659,580 A | 4/1987 | Svengren |
| 5,916,601 A | 6/1999 | Onoguchi et al. |

FOREIGN PATENT DOCUMENTS

| AT | 26906 | 5/1987 |
|---|---|---|
| DE | 29714754 U1 | 10/1997 |
| DE | 19739788 A1 | 3/1999 |
| DE | 69709506 | 8/2002 |

(Continued)

OTHER PUBLICATIONS

EPO machine translation of DE 19739788, retrieved Apr. 2, 2018 (Year: 2018).*

(Continued)

*Primary Examiner* — Timothy Kennedy
(74) *Attorney, Agent, or Firm* — Thompson Hine LLP (57) ABSTRACT

Severing apparatus (1) for severing a string of pasty foodstuff material, in particular of meat or doughs, into individual portions, comprising a movable and drivable severing knife (2, 2') having a knife edge (12), and at least one preferably stationary shear bar (8, 8') associated with the severing knife (2, 2'). The knife edge (12) of the severing knife (2, 2') has a cutting edge (20, 20') which is at least portion-wise concavely curved in the longitudinal direction of the severing knife.

20 Claims, 3 Drawing Sheets

(56) References Cited

FOREIGN PATENT DOCUMENTS

DE 102011085011 4/2013
FR 2565883 A1 12/1985

OTHER PUBLICATIONS

European Patent Office, Extended European Search report issued in Application No. 16158869.4 dated Jul. 26, 2016.

* cited by examiner

Fig.6

SEVERING APPARATUS FOR SEVERING A STRING OF PASTY FOODSTUFF MATERIAL

BACKGROUND

The invention concerns a severing apparatus for severing a string of pasty foodstuff material, in particular of meat or doughs, into individual portions, comprising a movable and drivable severing knife having a knife edge, and at least one preferably stationary shear bar associated with the severing knife. The invention further concerns an apparatus for shaping and conveying foodstuff products of pasty material.

Severing apparatuses are known in the state of the art, which are used for severing or subdividing a string of for example meat or doughs into individual portions. The portions, consisting of in particular pasty foodstuff materials, are usually discharged immediately after the severing operation for subsequent further processing or for direct packaging thereof, by means of downstream-disposed conveyor devices.

Such known severing apparatuses for severing, for example, an endless string of pasty foodstuff material have a movable and drivable severing knife having a knife edge and at least one counterpart cutter or shear bar which is associated with the severing knife and by means of which the foodstuff materials to be severed are supported from below and are moved against the driven severing knife. That makes the operation of severing or dividing the individual portions from the preferably continuously produced endless string of foodstuff material easier. The severing knives used usually have an elongated knife blade with a straight cutting edge or a knife blade which is curved in relation to the direction of movement of the severing knife and which has a cutting edge which is shaped convexly in the longitudinal direction of the knife blade.

For cutting or subdividing a string of pasty foodstuff material into individual portions, the severing knives known from the state of the art are moved with their straight or convexly shaped knife blade on a circular path around an axis of rotation. In that case, the rotating knife blade is frequently oriented substantially perpendicularly to the string of pasty foodstuff material. When the individual foodstuff portions are being produced, difficulties often occur during the severing operation using the known severing knives when cutting the string into individual portions.

In the case of severing knives with a straight knife blade which have a substantially straight cutting edge, the cutting action at the material to be subdivided is relatively slight. That means that, after prolonged use with such straight severing knives, untidy cuts sometimes occur as frequently residues of the foodstuff material to be subdivided are deposited at the cutting edge of the knife blade. Severing knives with convexly shaped cutting edges have a markedly improved cutting action because residues on the knife blade are avoided. However, in the severing operation, the severing knife with the convexly shaped cutting edge emerges laterally from the string of material to be cut, whereby the product is torn apart at the side where the severing knife issues. To avoid that, lateral guides are provided for the string to be subdivided. Aligning the guides is relatively adjustment-intensive. In addition, after a certain period of time, the guides have to be repeatedly freed of deposits of the foodstuff material which has been moved therepast.

Therefore, an object of the invention is to provide a severing apparatus for severing a string, by means of which the above-indicated disadvantages are avoided and in addition simplified severing is possible. In a severing apparatus of the above-indicated general kind, the foregoing object of the invention is attained in that the knife edge of the severing knife has a cutting edge which is at least portion-wise concavely curved in the longitudinal direction of the knife edge.

SUMMARY

The invention is based on the realisation that, with a knife edge on a severing knife which has a cutting edge which, in the longitudinal direction of the knife edge, that is to say along the knife blade used for severing the string, is at least portion-wise concavely curved, an improved cutting action is achieved on the string to be subdivided consisting of a foodstuff material. In comparison with a severing knife having a straight cutting edge, a severing knife having a cutting edge which at least portion-wise is concavely curved over a portion along the severing knife blade used for cutting has a steeper cutting angle, which simplifies severing the material. In contrast to a convexly shaped severing knife, the concavely shaped cutting edge according to the invention provides that the knife edge during the severing operation preferably passes into the string at both side surfaces, instead of entering the string at one side surface and emerging therefrom at the other side surface. That avoids regions of an endless string of pasty foodstuff material being torn open or torn apart. It is therefore possible to dispense with the use of additional lateral guides for the string of material. Besides an improved severing operation, the structural configuration of the severing apparatus according to the invention is also simplified.

In a preferred development of the severing apparatus according to the invention, the cutting edge of the severing knife is concavely curved over almost its entire length. Preferably, the knife blade of the severing knife is of a configuration which is adapted to the cutting edge. The knife blade is thus also of a curved configuration and is preferably of a substantially uniform blade height. In the present case, the term blade height is used to denote the dimension starting from the cutting edge in the direction of the oppositely disposed back of the knife blade. Preferably, the cutting edge is of a concave curvature with a substantially uniform radius of curvature or curvature configuration.

In an alternative configuration of the severing apparatus according to the invention, the cutting edge has at least two concavely curved cutting edge portions connected by a substantially straight cutting edge portion. The concavely curved cutting edge portions are preferably arranged at a spacing relative to each other along the cutting edge. In the present case the term portion-wise configuration of concavely shaped cutting edge portions does not denote the provision of individual small teeth at the knife edge. Preferably, a concavely curved cutting edge portion according to the invention is of a length which corresponds at least to a fifth of the total length of the knife edge of the knife blade used for severing. Preferably, the knife edge of the severing knife according to the invention has precisely two concavely curved cutting edge portions at preferably the respective end regions of the knife edge. The two curved cutting edge portions are connected by way of a substantially straight cutting edge portion which preferably extends along the central third of the knife blade.

Preferably, the knife edge has a proximal end in relation to the mounting point of the severing knife and a distal end, and at least one cutting edge portion concavely curved between the ends, and the severing knife is so mounted and movable relative to the shear bar that both ends of the knife edge substantially simultaneously pass the shear bar during the severing operation. That provides that when cutting the string of material into individual portions, in particular the side surfaces of the portion are no longer urged outwardly. The concave shape of the cutting edge results in cutting forces which move the regions to be severed in the direction of the center of the string of material. That preferably produces a clean peripherally extending cut edge at the portions which have been cut off or severed from the string. That therefore counteracts lateral deformation of the severed portions. Preferably, the proximal and the distal ends of the knife edge come into contact simultaneously with the preferably fixed shear bar of the severing apparatus. The central portion of the knife blade is then disposed at a spacing above the shear bar. Depending on the selected radius of curvature, the central portion with a cutting edge which is also concavely curved or with a substantially straight cutting edge is not yet or already in contact with the foodstuff material of for example meat or doughs of the string to be subdivided.

A preferred development of the invention provides that the severing knife is mounted rotatably about an axis of rotation and the substantially concave cutting edge of the severing knife is so shaped that during the severing operation two spaced cutting regions which are provided between the knife edge of the severing knife and the shear bar move towards each other. The configuration according to the invention of the knife edge which has at least a concavely curved cutting edge portion provides that the string to be subdivided is cut from the respective side surfaces in the direction of the center of the string. Preferably, the severing knife is mounted about an axis of rotation which is preferably oriented parallel to the conveyor direction of the string of foodstuff material. In that way, the severing knife subdivides the preferably continuously produced or formed endless string of foodstuff material transversely relatively to the conveyor direction. The rotatably mounted severing knife is of a preferably straight configuration in respect of the knife blade, considered in its cutting plane, starting from the mounting point or the point of rotation in the direction of the distal end of the knife edge. Viewed perpendicularly to the cutting plane, the cutting edge and also the knife blade of the severing knife are of a concave curvature on the side of the knife edge of the knife blade.

In another development of the invention, there are provided two shear bars which are arranged adjustably in spacing relative to each other and are adapted to form a cutting gap for the severing knife which can be passed through between the shear bars. By means of the shear bars which are arranged variably in spacing relative to each other and between which the severing knife is guided through a cutting gap formed by the two shear bars, guidance for the severing knife in the cutting direction is guaranteed during the severing operation. In addition, the cutting action of the severing knife is improved and at the same time this prevents an excessively large proportion of the foodstuff material to be severed being entrained by the cutting movement. The two shear bars form a preferably fixed support for the string of pasty material, which is guided above the shear bars.

Preferably, the shear bars delimiting the cutting gap have mutually facing cutting gap surfaces which extend at an acute angle relative to each other, the cutting gap enlarging in the direction of movement of the severing knife. The cutting gap surfaces which extend at an acute angle relative to each other or which are oriented inclinedly relative to each other provide for markedly reduced entrainment of pieces of the severed foodstuff material and an additional cutting action by virtue of the surface regions, which are preferably guided along each other, of the knife blade of the severing knife and at least one of the shear bars. The shear bars are at their smallest spacing at the mutually opposite edges of the shear bars. The cutting gap which enlarges in the cutting direction reduces 'blocking' by entrained foodstuff material and also affords reduced friction with the severing knife which can be passed through between the shear bars, whereby the long-term functioning of the knife edge of the severing knife is improved.

In another development of the severing apparatus according to the invention, the cutting gap between the shear bars has an oversize in relation to the width of the cutting knife in the region of between 0 mm and 0.5 mm. The slight oversize of the cutting gap relative to the width of the knife blade of the severing knife ensures an improved cutting action and at the same time enhanced self-cleaning of the severing knife when passing through the narrow cutting gap. Fibrous or sinewy constituents of the foodstuff material to be subdivided are preferably at least stripped off by virtue of the slight oversize at the shear bars and in the best-case scenario also cut. In addition, the loss of product can be reduced to a minimum as only little material can be pushed through the gap due to the slight oversize of the cutting gap.

Preferably, the shear bar which is the front bar in relation to the conveyor direction of the string has a substantially flat sliding surface for the foodstuff material, which preferably extends parallel or inclinedly relative to a horizontal. The string of pasty foodstuff material is respectively fed to the severing knife in properly directed relationship by way of the substantially flat sliding surface which is preferably oriented parallel to a horizontal in relation to the surroundings. The severing knife which is guided preferably perpendicularly to the conveyor direction of the string and the sliding plane of the front shear bar provides that the string is subdivided into individual portions with cut surfaces which preferably extend perpendicularly to the longitudinal axis of the string. The preferably horizontally extending sliding surface of the front shear bar is arranged in the near region of a conveyor device which can be disposed upstream of the severing apparatus, thereby ensuring simple transfer of the string which is to be subdivided into portions from a conveyor device to the severing apparatus. A further embodiment of the invention provides that the severing knife with its knife blade is arranged or oriented relative to the cutting edge of the front shear bar in such a way that the knife blade and the cutting edge are directly in contact with each other. Preferably, the cutting edge of the front shear bar has no gap or a gap size equal to zero relative to the side of the knife blade that is the front side as viewed in the conveyor direction.

In another development of the invention, the shear bar which is the rear bar in relation to the conveyor direction of the string has a substantially flat sliding surface for the foodstuff material, which preferably extends at an angle inclinedly relative to the horizontal, preferably falling away in the conveyor direction. The sliding surface which extends inclinedly relative to the horizontal permits simplified discharge in the direction of a conveyor device which is arranged downstream for example of the severing apparatus according to the invention. According to an embodiment of the invention the rear shear bar is so arranged relative to the rotatably mounted severing knife that the cutting edge of the rear shear bar is arranged at a spacing relative to the severing knife which can be passed through between the shear bars. A gap in the region of between 0 mm and 0.5 mm is provided between the cutting edge of the rear shear bar and the side of the knife blade, that is the rear side in the conveyor direction. The spacing of the rear shear bar relative to the severing knife determines the oversize of the cutting gap relative to the width of the severing knife and thus the total gap dimension between the shear bars.

In another development of the invention, there is provided a drive device, preferably an electric or fluid motor, at which the severing knife is rotatably movably arranged. The severing knife can move about the axis of rotation which is preferably oriented parallel to the conveyor direction of the string of pasty foodstuff material in a simple fashion by means of the drive device. Preferably, the drive device implements a uniform rotary movement of the severing knife or a continuous movement of the severing knife at a preferably uniform speed of rotation. In an embodiment of the present invention the drive device is driven over a predetermined rotary angle at a varying speed. Preferably, the drive device moves the severing knife during the severing operation at an increased speed through the string of pasty foodstuff material, that is to be subdivided. Particularly in the case of a continuously implemented conveyor movement of the string in its conveyor direction, that produces an almost perpendicular cut surface on both respective sides of the individual portions.

In another development of the severing apparatus according to the invention, the severing knife has a substantially sickle-shaped knife blade on which the knife edge is provided and a fixing portion, wherein the fixing portion is enlarged in relation to the sickle-shaped portion and which has at least one eccentrically arranged material opening for making a connection to the drive device. The fixing portion is of an approximately circular configuration on which the curved knife blade is arranged with its preferably concavely curved cutting edge. The proximal end of the knife edge or the knife blade, that is associated with the axis of rotation of the fixing portion, is preferably coupled to the periphery of the fixing portion, the connecting region of the knife blade involving a tangential orientation relative to the center of the fixing portion. The material opening, in particular in the form of a through bore, is arranged eccentrically on the fixing portion of the severing knife. In conjunction with the knife blade formed tangentially at the fixing portion, that involves a heightwise displacement between the axis of rotation and the preferably stationary cutting edge of the shear bars. That has the advantage that the severing knife requires a reduced space for movement beneath the shear bars. According to en embodiment of the invention, the free end of the severing knife is guided by means of a knife guide, thereby resisting deflection of the severing knife over its length during the cutting operation. The knife guide is preferably in the form of a circular guide rail with at least one guide groove for the distal end of the knife blade, that can be received therein.

In another development of the severing apparatus according to the invention, there is provided a conveyor device cooperating with the severing apparatus for conveying the string of the foodstuff material to the severing apparatus. An endless string which in particular is to be continuously conveyed can be fed to the severing apparatus according to the invention in a simple fashion by means of the conveyor device which is disposed upstream of the severing apparatus, relative to the conveyor direction of the string to be severed. The conveyor device includes at least one peripherally extending conveyor element like for example a conveyor belt, wherein in particular the discharge region of the conveyor element is associated directly with the front shear bar of the severing apparatus. This means that the front shear bar is arranged directly after the discharge region of the conveyor element. In an embodiment of the invention the top side of the conveyor element and the sliding surface of the front shear bar are arranged approximately in one plane.

The invention further concerns an apparatus for shaping and conveying foodstuff products of pasty material, comprising a filling machine for the foodstuff material, a shaping device arranged on the filling machine for shaping three-dimensional products from the foodstuff material, and a severing apparatus disposed downstream of the filling machine for severing a string of pasty foodstuff material according to one of the above-described preferred embodiments, and a conveyor device disposed downstream of the severing apparatus for conveying the separated portions.

The invention is based on the realisation that the production of in particular three-dimensional products from the foodstuff material can be effected in a simplified fashion with such an apparatus according to the invention. With the severing apparatus used, it is possible on the one hand to minimise the loss of product and on the other hand to reduce the structural complication and involvement in the region of the severing apparatus, by for example the omission of lateral guides for the moved string of foodstuff material. The filling machine preferably has a filling hopper for receiving the pasty material and at least one conveyor pump for conveying the pasty material from the filling hopper in the direction of the shaping device arranged at the filling machine. To shape the pasty material into for example an endless string, the shaping device is for example in the form of a grinding unit having a grinding disk with a plurality of apertures passing through the grinding disk. The grinding units shapes for example a continuous endless string from many small individual strings of the pasty material. The endless string produced by the shaping device is fed to the severing apparatus by way of a conveyor device disposed upstream of the severing apparatus. The individual portions or string pieces are produced by means of a preferably rotating severing knife at the severing apparatus. In addition, at least one conveyor device for conveying the separated portions is connected downstream of the severing apparatus, to be able to discharge the separated portions for further processing or for direct packaging thereof. The conveyor device for discharging the separated portions has at least one circulating conveyor element, preferably a conveyor belt. In regard to further preferred configurations of the apparatus according to the invention for the production of foodstuff products attention is directed to the foregoing description relating to the severing apparatus according to the present invention.

BRIEF DESCRIPTION OF THE DRAWINGS

The invention is described in greater detail hereinafter by means of a preferred embodiment by way of example with reference to the accompanying Figures.

DETAILED DESCRIPTION

Figure 1:
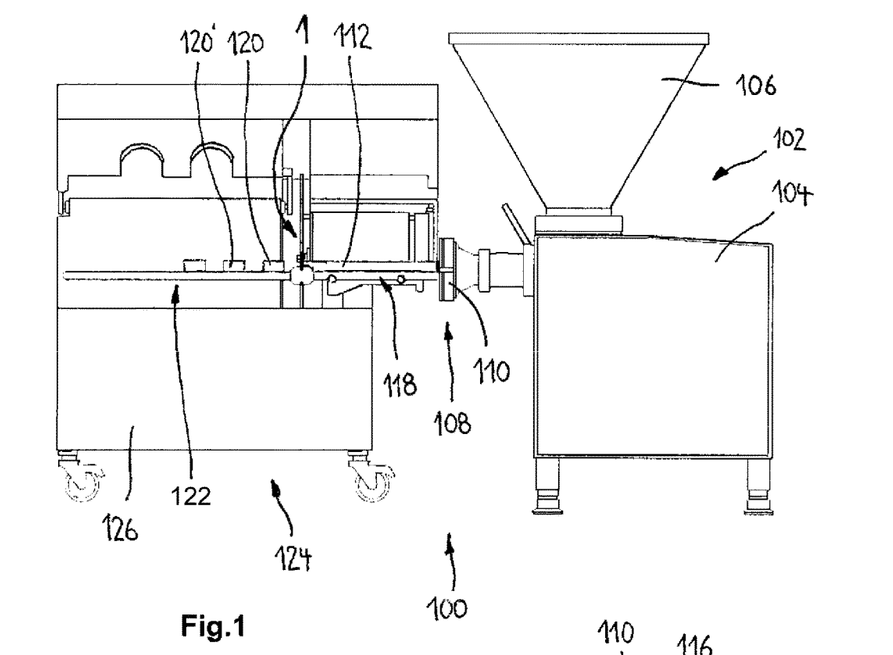
FIG. 1 shows a diagrammatic view of an apparatus according to an embodiment of the invention for the production of foodstuff products of pasty material.

FIG. 1 shows an apparatus 100 for shaping and conveying and thus for producing foodstuff products of pasty material. The apparatus 100 includes a filling machine 102 having a housing 104 on which is arranged a filling hopper 106 for receiving meat or baked products. In addition disposed within the housing 104 is a conveyor pump (not shown) with which the products in the filling hopper 106 are conveyed to a shaping device 108 arranged on the filling machine 102. The shaping device 108 has a shaping portion 110 for discharge of an endless string 112 of the foodstuff material. The shaping portion 110 has a shaping disk 114 having a plurality of through openings 116, 116' (FIG. 2).

In operation, the endless string 112 discharged from the shaping disk 114 is conveyed by means of a conveyor device 118 to a severing apparatus 1 for severing the string 112 into individual portions 120, 120'. Connected downstream of the severing apparatus 1 is a conveyor device 122 with which the separated portions 120, 120' are carried away for further processing. The conveyor device 122 is part of a conveyor machine 124 having a machine frame 126 movable on rollers.

Figure 2:
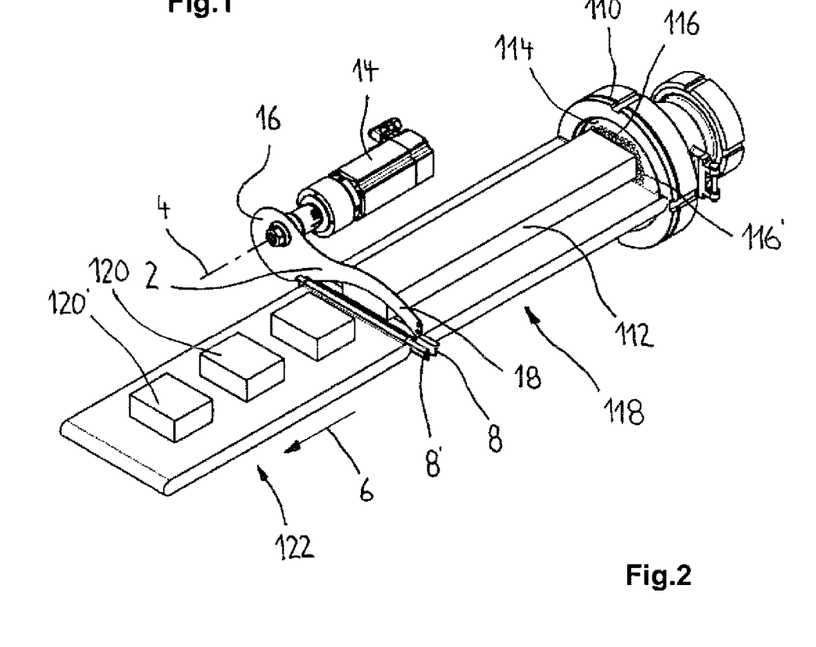
FIG. 2 shows a perspective partial view of the apparatus of FIG. 1 with a severing apparatus according to an embodiment of the invention.
Figure 3:
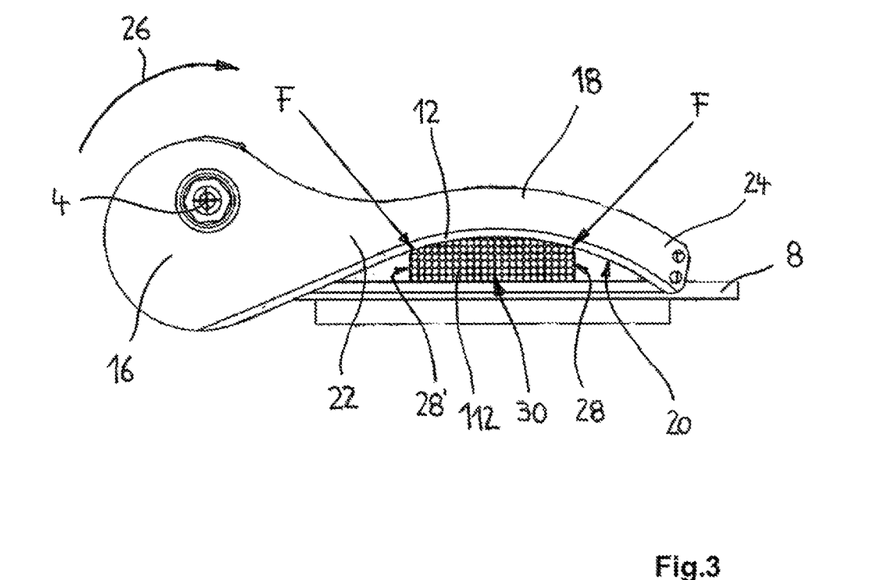
FIG. 3 shows a view of the severing apparatus according to the embodiment of the invention as shown in FIG. 2.

FIG. 2 shows a view of part of the apparatus according to the invention, which is intended in particular to clearly show the arrangement or structure of the severing apparatus 1. The endless string 112 which is discharged from the shaping portion 110 and which is carried away in the direction of the severing apparatus 1 by means of the conveyor device 118 is cut up or subdivided by means of a drivable severing knife 2 into portions 120, 120' of predetermined size and length. The severing knife 2 is mounted rotatably about an axis of rotation 4, the axis of rotation 4 extending parallel to the conveyor direction (arrow 6). Associated with the severing knife 2 are two stationary shear bars 8, 8' between which is formed a cutting gap 10 (FIG. 4), through which the severing knife 2 is moved between the shear bars 8, 8'. As can further be seen from FIG. 2, the severing knife has a knife edge 12 having a cutting edge 20 which is at least portion-wise concavely curved in the longitudinal direction of the knife (FIG. 3). The severing knife 2 is moved about the axis of rotation 4 by using a drive device 14 in the form of an electric or fluid motor. The severing knife 2 has a fixing portion 16 for connection to the drive device, on which is arranged a substantially sickle-shaped knife blade 18 having the at least portion-wise concavely curved cutting edge. Arranged in front of and after the severing device 1 are respective conveyor devices 118, 112 with which the pasty foodstuff material in the form of an endless string is fed to the severing apparatus and is carried away from the severing apparatus for further processing in the form of separated portions 120, 120'.

FIG. 3 shows a front view of the severing apparatus with the severing knife 2 and the shear bar 8. The shear bar 8' is not shown for simplicity purposes. As can be seen from FIG. 3, the severing knife 2 is so mounted and moved relative to the shear bars 8, 8' and the substantially concave cutting edge 20 is so shaped that a proximal end 22, in relation to the axis of rotation 4 of the severing knife 2, and a distal end 24, substantially simultaneously pass the shear bars 8, 8' during the cutting operation. By virtue of the concave configuration of the cutting edge 20 of the knife blade 18 and the rotatable mounting thereof about the axis of rotation 4, two spaced cutting regions between the knife edge 12 of the severing knife 2 and the shear bars 8, 8' move towards each other during the severing operation. The severing knife 2 moves in the direction of rotation 26 about the axis of rotation 4 during the cutting operation. As FIG. 3 further shows, the concave configuration of the cutting edge 20 provides that the cutting action of both cutting regions at the side edges 28, 28' of the string 112 of pasty foodstuff material involve a direction of force F in the direction of the center 30 of the endless string 112.

Figure 4:
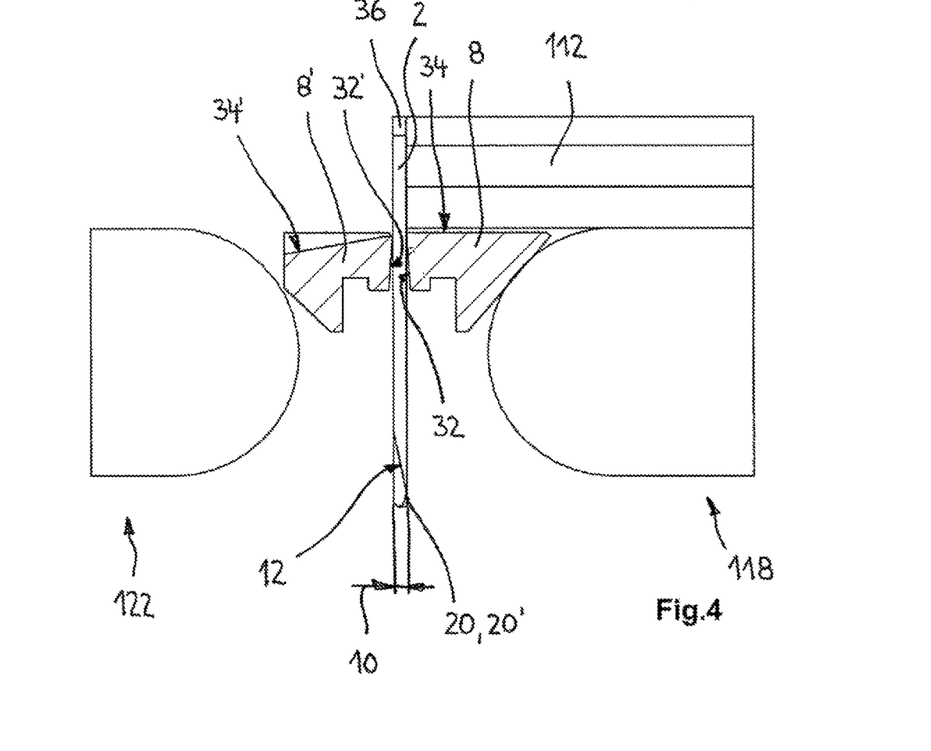
FIG. 4 shows a side view of the severing apparatus according to the embodiment of the invention as shown in FIG. 2.

FIG. 4 shows a side view of the severing apparatus 1, clearly showing the structure or arrangement of the shear bars 8, 8'. The shear bars 8, 8' are arranged displaceably in their spacing relative to each other. The cutting gap 10 is thus adjustable, wherein it is of an oversize in relation to the width of the severing blade 2 which is guided through the cutting gap 10, in the range of between 0 and 0.5 mm. The shear bars 8, 8' have mutually facing cutting gap surfaces 32, 32'. The cutting gap surfaces 32, 32' extend at an acute angle relative to each other, the cutting gap 10 increasing in width in the direction of movement of the severing knife. The cutting gap 10 thus involves its narrowest dimension at the upper ends of the cutting gap surfaces 32, 32'. In relation to the conveyor direction of the string 122, the shear bar 8 is the front one of the shear bars 8, 8', which has a substantially flat sliding surface 34 for the foodstuff material and which preferably extends parallel to the horizontal. The front shear bar 8 is arranged at an invariable spacing relative to the rotating severing knife 2 and is at a spacing equal to zero to the front side of the blade of the severing knife 2. The shear bar 8' which is the rear bar in relation to the conveyor direction of the string also has a substantially flat sliding surface 34' for the foodstuff material, the sliding surface 34' being arranged inclined at an angle to the sliding surface of the shear bar 8. In this arrangement the sliding surface 34 extends in a falling relationship in the conveyor direction. The shear bar 8' is arranged at a variable spacing relative to the severing knife 2, wherein the oversize of the cutting gap 10 relative to the width dimension of the severing knife 2 is determined by way of the shear bar 8' which can be arranged variably. In the present embodiment the shear bar 8 is at a spacing of 0 mm relative to the front side of the blade of the severing knife 2. In contrast, in relation to the rear side of the blade of the severing knife 2, the shear bar 8' is at a spacing of between 0 and 0.5 mm, which is adapted in particular in connection with the foodstuff materials to be cut.

Figure 5:
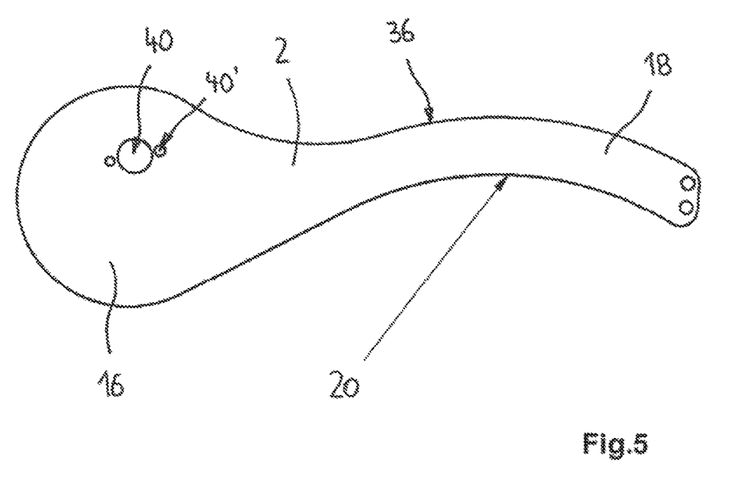
FIGS. 5 and 6 show views of possible embodiments of the severing knife used on the severing apparatus according to the invention.
Figure 6:
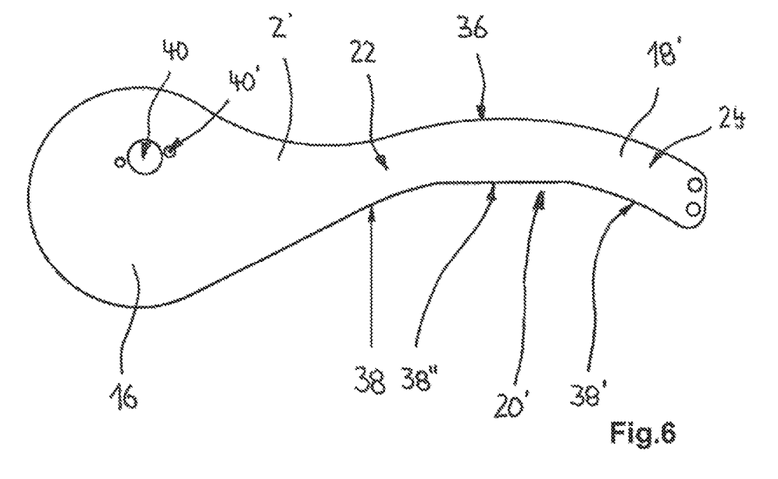

FIGS. 5 and 6 show two possible embodiments of severing knifes 2, 2'. Both severing knives 2, 2' have a fixing portion 16 and a knife blade 18, 18' which adjoins same in a sickle configuration. The two knife blades 18, 18' each have a respective convexly shaped back 36 and are formed substantially tangentially to the periphery of the fixing portion 16. The knife blade 18 shown in FIG. 5 has a knife edge with a cutting edge 20 which is curved concavely almost over its entire length. In contrast thereto, the knife edge on the knife blade 18' has a cutting edge 20' with two respectively concavely curved cutting edge portions 38, 38' arranged at the proximal end 22 and at the distal end 24 of the knife blade 18'. The cutting edge portions 38, 38' are connected together by way of a substantially straight cutting edge portion 38" arranged approximately on half the knife edge.

The fixing portion 14 of a respective severing knife 2, 2' has a plurality of material openings 40, 40', in the present case in the form of through bores. The severing knives 2, 2' are non-rotatably connected by way of the openings 40, 40' to a receiving portion 42 of the drive device 14 (FIG. 2). The openings 40, 40' are arranged eccentrically relative to the central region of the fixing portion.

The same or similar components are denoted by the same references.

LIST OF REFERENCES 1 severing apparatus
2, 2' severing knife
4 axis of rotation
6 conveyor direction
8, 8' shear bar
10 cutting gap
12 knife edge
14 drive device
16 fixing portion
18, 18' knife blade
20, 20' cutting edge
22 proximal end
24 distal end
26 direction of rotation
28, 28' side edge
30 central axis
32, 32' cutting gap surface
34, 34' sliding surface
36 back
38, 38', 38" cutting edge portion
40, 40' material opening
42 receiving portion
100 apparatus
102 filling machine
104 housing
106 filling hopper
108 shaping device
110 shaping portion
112 endless string
114 shaping disk
116, 116' through opening
118 conveyor device
120, 120' portion
122 conveyor device
124 conveyor machine
126 machine frame
F direction of force

The invention claimed is:

1. An apparatus for severing a string of foodstuff material into individual portions, the apparatus comprising
a movable and drivable severing knife having a knife edge; and
at least one shear bar associated with the severing knife, wherein the knife edge of the severing knife has a cutting edge that is at least portion-wise concavely curved in the longitudinal direction of the severing knife, and
the knife edge has a proximal end in relation to a mounting point of the severing knife and a distal end, the knife edge has at least one concavely curved cutting edge portion between the ends, and the severing knife is so mounted and movable relative to the shear bar such that, during the severing operation, the proximal end and the distal end of the knife edge are substantially simultaneously within a cross sectional area of the at least one shear bar and first and second spaced cutting regions provided between the knife edge of the severing knife and the at least one shear bar move towards each other.

2. The apparatus of claim 1 wherein the at least one shear bar is stationary relative to the severing knife.

3. The apparatus of claim 1 wherein the cutting edge of the severing knife has a length and is concavely curved over substantially all of the length.

4. The apparatus of claim 1 wherein the cutting edge has a substantially straight cutting edge portion and at least two concavely curved cutting edge portions connected by the substantially straight cutting edge portion.

5. The apparatus of claim 1 wherein the severing knife is mounted rotatably about an axis of rotation.

6. An apparatus for severing a string of foodstuff material into individual portions, the apparatus comprising
a movable and drivable severing knife having a knife edge; and
at least one shear bar associated with the severing knife, wherein the knife edge of the severing knife has a cutting edge that is at least portion-wise concavely curved in the longitudinal direction of the severing knife, and
the at least one shear bar comprises first and second shear bars that are arranged adjustably in spacing relative to each other and that are adapted to form a cutting gap for the severing knife to pass through between the shear bars.

7. The apparatus of claim 6 wherein the first and second shear bars delimit the cutting gap and have mutually-facing cutting gap surfaces that extend at an acute angle relative to each other, and the cutting gap enlarges in the direction of movement of the severing knife.

8. The apparatus of claim 6 wherein the cutting gap between the shear bars is larger than a width of the cutting knife in a range of between 0 mm and 0.5 mm.

9. The apparatus of claim 6 wherein the first shear bar is in front of the second bar in relation to the conveyor direction of the string and has a substantially flat sliding surface for the foodstuff material.

10. The apparatus of claim 9 wherein the substantially flat sliding surface of the first shear bar extends parallel relative to a horizontal.

11. The apparatus of claim 9 wherein the substantially flat sliding surface of the first shear bar extends at an angle inclined relative to a horizontal.

12. The apparatus of claim 9 wherein the second shear bar has a substantially flat sliding surface for the foodstuff material.

13. The apparatus of claim 12 wherein the second shear bar extends at an angle inclined relative to a horizontal.

14. The apparatus of claim 13 wherein the angle falls away in a direction in which the string of foodstuff material is being conveyed.

15. The apparatus of claim 1 further comprising:
a drive device at which the severing knife is rotatably movably arranged.

16. The apparatus of claim 15 wherein the drive device is an electric motor or a fluid motor.

17. The apparatus of claim 16 wherein the severing knife has a substantially sickle-shaped knife blade on which the knife edge is provided and a fixing portion that is enlarged in relation to the sickle-shaped portion and at which at least one eccentrically arranged material opening is provided for making a connection to the drive device.

18. The apparatus of claim 1 further comprising:
a conveyor device configured to convey the string of foodstuff material to the severing knife and the at least one shear bar.

19. The apparatus of claim 1 further comprising:
a filling machine for the foodstuff material;

a shaping device arranged on the filling machine for shaping three-dimensional products from the foodstuff material; and a conveyor device disposed downstream of the severing knife and the at least one shear bar, the conveyor device configured to convey the individual portions separated from the string of foodstuff material by the severing knife and the at least one shear bar.

20. The apparatus of claim 6 further comprising:

a filling machine for the foodstuff material;

a shaping device arranged on the filling machine for shaping three-dimensional products from the foodstuff material; and a conveyor device disposed downstream of the severing knife and the at least one shear bar, the conveyor device configured to convey the individual portions separated from the string of foodstuff material by the severing knife and the at least one shear bar.

\* \* \* \* \*